July 23, 1929.  H. G. McCOMB  1,722,056
GARMENT HOLDER
Filed June 7, 1924

INVENTOR
Henry G. McComb
BY
Philip S. McLean
ATTORNEY

Patented July 23, 1929.

1,722,056

UNITED STATES PATENT OFFICE.

HENRY G. McCOMB, OF BRONX, NEW YORK.

GARMENT HOLDER.

Application filed June 7, 1924. Serial No. 718,492.

This invention relates particularly to garment holders or supporters and special objects of the invention are to provide a flexible grip which will hold securely without injury to the fabric.

In the accompanying drawing forming part of this specification the invention is disclosed embodied in a garment construction, wherein:

Figures 1 and 2 are perspective and part sectional views of one form of the garter.

Figures 3 and 4 are sectional views illustrating modifications in the method of attaching the gripping material to the garter elastic.

Figure 5 is a fragmentary plan of a piece of the crepe rubber.

Figure 1:
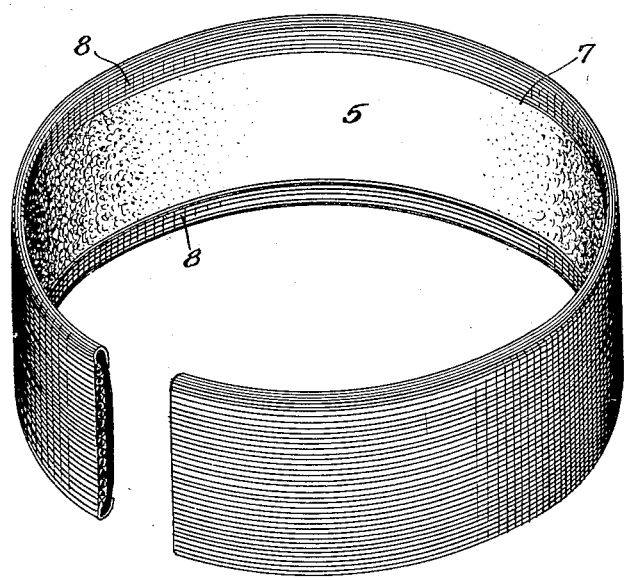
Figure 1:
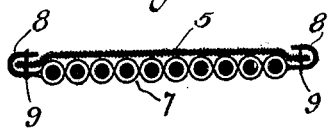
Figure 1:
Figure 1:
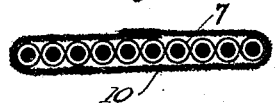
Figure 1:
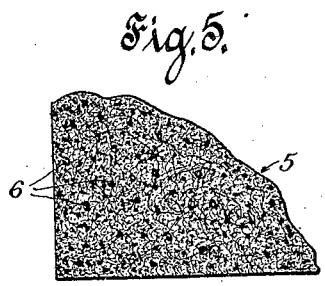

A special feature of this invention is the utilization of what is known as crude, unvulcanized "crepe" rubber for a gripping element. This is substantially pure latex coagulated with acetic acid and passed through reducing rolls for quick drying. This unvulcanized rubber has a peculiar gummy or cohesive quality, which "sticky" characteristic is retained so long as the rubber is not vulcanized and does not wear off with use. The inherent cohesive character of this particular rubber causes the same to adhere and actually "cling" to a fabric material.

In addition to the cohesive characteristic referred to, unvulcanized crepe rubber has a remarkably irregular, uneven and lumpy surface produced apparently by the coagulation of the crude latex, a roughness producing a multitude of closely related and more or less angular spurs and projections.

In Figure 5 a sheet of crude crepe rubber is indicated at 5 and in this view I have attempted to illustrate in an exaggerated way at 6, some of the multitudinous, more or less minute angularly projecting spurs or points.

In the first form of the invention illustrated, the crude unvulcanized crepe rubber is shown as a relatively thin sheet providing a facing on the inside of the garter body 7 and held thereto by the selvage strips 8 at the edges of the garter elastic turned over the face of the rubber sheet and secured by cement or stitching 9.

In the second form of the invention illustrated, the sheet of crepe rubber is shown simply secured to the face of the elastic webbing by means of a suitable adhesive such as rubber cement. The sheets used are preferably quite thin and as they are equally rough on both sides, the adhesive takes a very firm hold and is therefore sufficient for ordinary purposes to hold the rubber in place.

As a further modification, the rubber sheet may be made as an envelope 10 completely encircling the elastic webbing. With this construction both the inside and the outside surfaces may be used by turning the band inside out.

While I have shown only a few adaptations of the invention, it will be understood by those skilled in the art that the invention may be embodied in other forms and applied to other uses without departure from the broad spirit and scope of the invention as claimed.

What is claimed is:—

In combination with a supporting web having selvage at the edges of the same, a strip of naturally rough crude unvulcanized crepe rubber overlying the face of said web, the selvage edges of the web being turned over the edges of said strip and secured fast to thereby hold the strip in place and protect the edges of the same.

In witness whereof, I have hereunto set my hand this 3rd day of June, 1924.

HENRY G. McCOMB.